Aug. 2, 1955 E. CRAVENER 2,714,567
PRELIMINARY PRESSING OF BENT LAMINATED GLASS
Filed Oct. 17, 1952 2 Sheets-Sheet 2

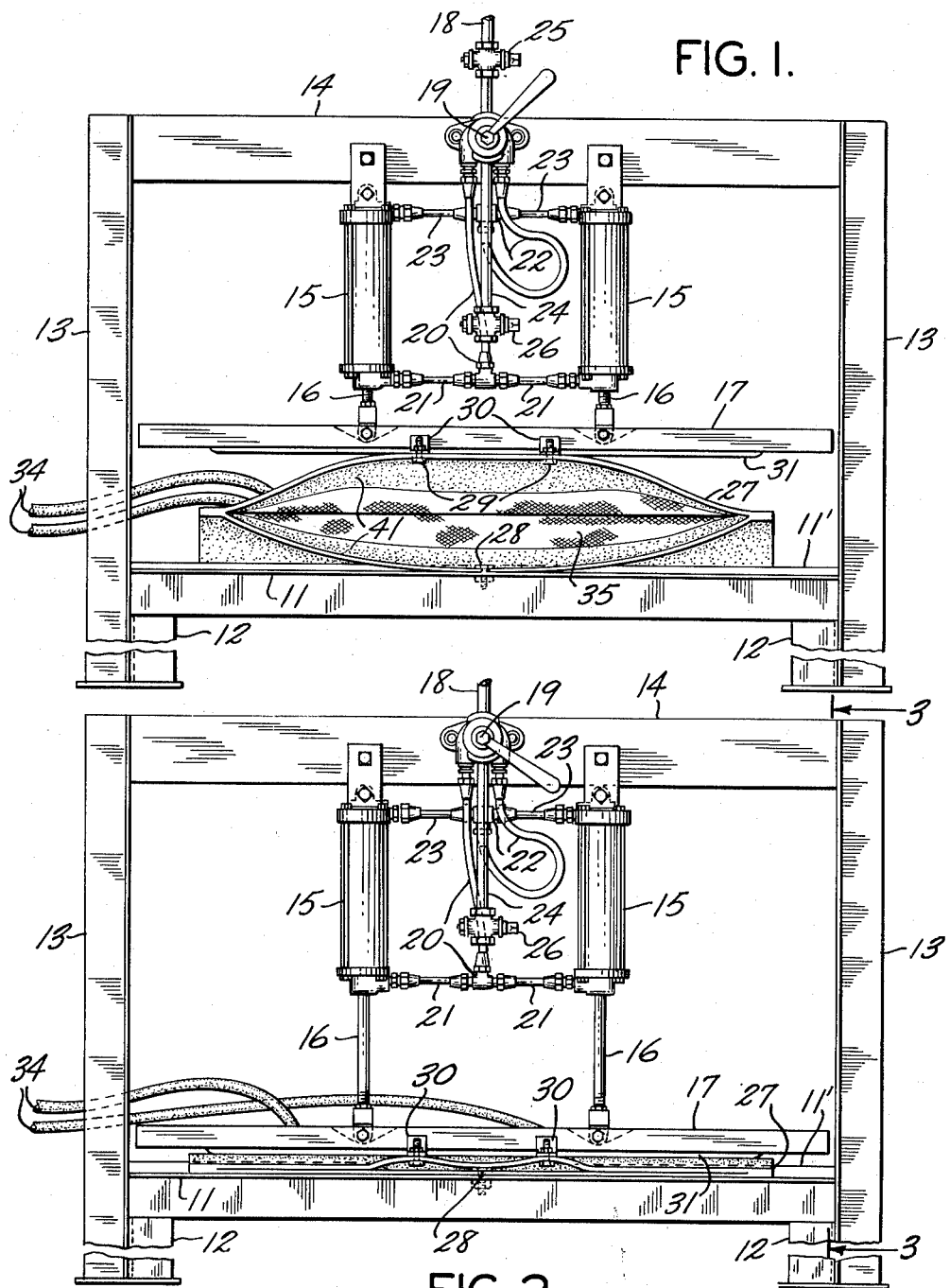

INVENTOR.
EARL CRAVENER
BY Oscar L. Spencer
ATTORNEY

United States Patent Office 2,714,567
Patented Aug. 2, 1955

2,714,567

PRELIMINARY PRESSING OF BENT LAMINATED GLASS

Earl Cravener, Tarentum, Pa., assignor to Pittsburgh Plate Glass Company, Allegheny County, Pa., a corporation of Pennsylvania Application October 17, 1952, Serial No. 315,252

10 Claims. (Cl. 154—2.7)

This invention relates to apparatus and method for making laminated assemblies of glass and interposed plastic sheets, commonly known as safety glass, and more particularly to the preliminary pressing of curved or bent laminated assemblies to provide a sufficient seal between the plastic interlayer and the glass sheets so as to dispense with the use of the rubber bag commonly used to enclose the assembled sheets during the autoclaving step.

In the manufacture of such laminated assemblies it generally is desirable to obtain the final, overall, adhesive bond between the glass sheets and the interposed thermoplastic sheet by subjecting the assembled sheets to heat and pressure while immersed in oil in an autoclave. Unless the edges of the assembled sheets are preliminarily sealed or otherwise protected, the oil in the autoclave is likely to penetrate between the laminations and discolor the assembly. In the manufacture of flat laminated assemblies it has been customary to subject the assembled sheets to a preliminary pressing by passing them between one or more pairs of rolls covered with suitable resilient material, these rolls being known as nipper rolls. This operation forces the air out from between the assembled sheets and provides a sufficient seal extending over the entire area of the sheets to prevent damage from the oil when directly immersed therein in the autoclave.

In the manufacture of bent or curved laminated assemblies, such for example as curved windshield panels, curved lenses for goggles, and the like, the use of the conventional nipper rolls has not been satisfactory. Because the sheets are bent or curved, it is practically impossible to obtain a uniform pressure over the entire area of the assembled sheets with the conventional nipper rolls, and consequently there is danger of excessive breakage of glass during the rolling operation, and of penetration of oil at the edges, when the rolled assembly is placed in the autoclave. As an alternative, it has been customary practice to place the assembled laminated sheets in a flexible container, for example a rubber or neoprene bag, which was then evacuated to hold the assembled sheets in proper position during the autoclaving operation. In this case, of course, even though there was no preliminary sealing of the edges of the laminations, penetration of oil between the laminations was prevented by the bag. This method, while producing a satisfactory product, has been expensive, cumbersome and time-consuming in operation.

It is an object of the present invention to provide an apparatus and method for subjecting the assembled laminated sheets to a preliminary pressing operation which results in a sealing at the marginal edge portions of the assembled sheets so that they may be placed directly in an autoclave without danger of edge discoloration due to penetration of oil. Another object of the invention is to provide apparatus in which air may be removed from between the assembled sheets, and in which the marginal edge portions of bent assemblies may be sealed against penetration of oil, with small danger of breakage of the glass. It is a further object of the invention to provide apparatus in which such sealing operation may be performed rapidly and economically. Other objects and advantages of the invention will appear hereinafter.

A preferred apparatus suitable for carrying out the method has been selected for purposes of illustration and is shown in the accompanying drawings, wherein:

Figure 1 is a front elevation of apparatus for the preliminary pressing of laminated assemblies, showing the bag which is to receive the assembled sheets for preliminary pressing in open position;

Figure 2 is a view similar to Figure 1, but showing the bag closed;

In accordance with the present invention the assembled glass and interposed plastic sheets are inserted in an impervious bag which is then sealed and evacuated to remove most of the air. This results in the atmosphere pressing the walls of the bag against the opposite sides of the assembled sheets uniformly over their entire surfaces. The bag walls comprise layers of electrically conductive rubber and when current is passed through these conductive layers the assembly within the bag is heated and the laminations are sealed together by the heat and pressure. Apparatus is provided for supporting the bag, for quickly opening the bag to facilitate insertion of a laminated assembly and removal of the assembly without waiting for the bag to cool, and to seal the bag after an assembly has been inserted. In most cases the apparatus will be used only to provide a preliminary seal between the laminations, the final pressing being accomplished in an autoclave in which the laminated assemblies are exposed directly to heated oil under high pressure, but in other cases the apparatus may be employed to completely seal the laminations.

Figure 3:
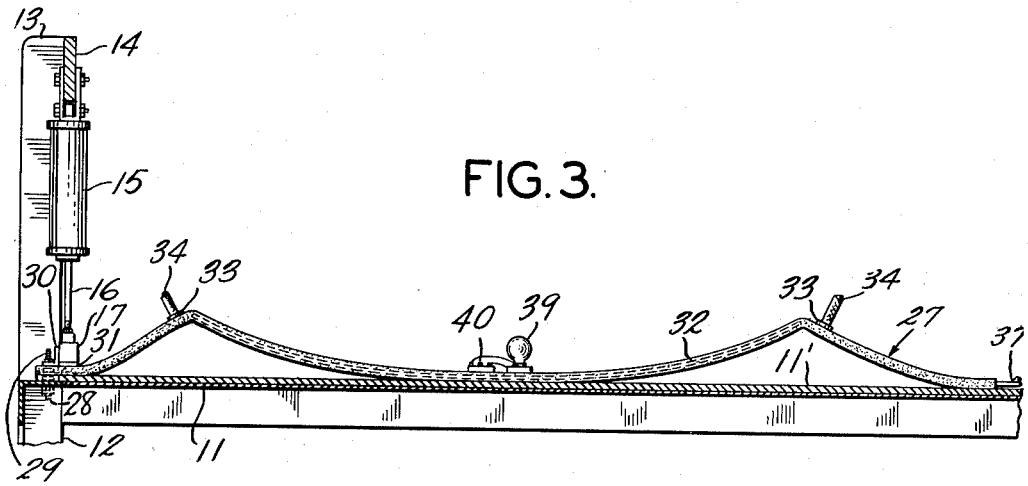
Figure 3 is a vertical section through the apparatus taken substantially on line 3—3 of Figure 2, but to somewhat reduced scale.

Referring first to Figures 1–3, a horizontal platform 11 is supported by legs 12 at convenient height. Extending upwardly above the top surface of the platform at opposite sides of one end thereof are vertical frame members 13 which are connected together at their upper ends by the cross support 14. These members all are rigidly joined together, as by welding. The construction of the platform is made such that it will support the bag and the laminated assembly of glass and plastic sheets to be inserted therein, and the dimensions of the platform surface are at least as great as the dimensions of the bag when it lies thereon.

Secured to the cross-support 14 are two vertically disposed similar air cylinders 15 spaced equidistant from the vertical frame members 13. These air cylinders 15 project downwardly from the cross-support toward the top of the platform. Connected to the plungers 16 of the air cylinders, parallel to the top of the platform 11, is a clamping bar 17.

Air under pressure can be supplied to the lower ends of the two air cylinders from the compressed air line 18, through valve 19, manifold arrangement 20, and branch leads 21 to raise the plungers 16 and the connected clamping bar 17 to the position shown in Figure 1. Air under pressure also can be supplied to the upper ends of the two air cylinders from the compressed air line 18, through valve 19, manifold arrangement 22, and branch leads 23 to lower the plungers 16 and the connected clamping bar 17 to the position shown in Figures 2 and 3.

With the valve 19, illustrated as a manually operated valve, in the position shown in Figure 1, the compressed air line 18 is connected to the manifold arrangement 20 to supply air to the lower ends of the cylinders, and the manifold arangement 22 is connected to the atmosphere through the pressure relief pipe 24. When the valve 19 is actuated from the position shown in Figure 1 to that shown in Figure 2, the air line 18 is connected to the manifold arrangement 22, and the manifold arrangement 20 is connected to the atmosphere through the pressure relief pipe 24. From the foregoing description it will be evident that the raising and lowering of the clamping bar 17 may be controlled simply by actuation of the valve 19. Since the two air cylinders 15 are alike, and compressed air is supplied to the bottoms or to the tops of the two air cylinders simultaneously, depending on the position of the valve 19, the clamping bar will remain in horizontal position parallel to the platform top as it is raised or lowered.

A valve 25 may be provided in the compressed air line 18 to shut off the compressed air from the pressing apparatus when the machine is not in use, and a valve 26 may be provided in the pressure relief pipe 24 to close the air cylinders off from the atmosphere at such times.

The bag 27 in which the laminated assembly of glass and plastic sheets is to be inserted for the preliminary pressing and heating operation lies on the platform 11 with its open end projecting outwardly a short distance under the clamping bar 17. The lower wall of the bag is secured to the platform adjacent the open end of the bag and intermediate its side edges, as by means of a flat headed bolt 28 extending through the wall of the bag and the platform. The upper wall of the bag is secured to the clamping bar 17 intermediate the side edges of the bag, as by means of two flat headed bolts 29 which engage brackets 30 secured on the forward edge of the clamping bar. The under side of the clamping bar preferably is provided with a resilient pad 31 which will be pressed against the upper wall of the bag when the clamping bar is in its lowered position.

With the plungers 16 of the air cylinders 15 in raised position, as shown in Figure 1, the end of the bag 27 is held open so that a laminated assembly of glass and plastic sheets may be easily pushed into the bag. When the plungers 16 are lowered, by manipulation of the valve 19, the bag closes and the clamping bar 17, extending across the end of the bag, is pressed firmly against the bag by the pressure of the air in the air cylinders, thus sealing the end of the bag so that the air may be evacuated therefrom. Figure 2 shows the end of the bag closed and sealed, and Figure 3 shows the closed bag with a bent laminated assembly 32 of glass and plastic sheets therein. Since the bag 27 is attached to the platform 11 only at its open end, the bag is otherwise free to slide and move sufficiently on the platform so as to accommodate itself readily to the shape of the bent laminated assembly which is inserted therein.

The wall of the bag 27, conveniently the upper wall as the bag lies on the platform, is provided with one or more hose connections 33 which are connected to vacuum lines 34 for evacuating air from the bag after a laminated glass and plastic assembly has been inserted therein and the end of the bag has been closed and sealed. Evacuation of air from the bag, preferably under about 24 inches of mercury or more, withdraws air which might otherwise enter or remain between the glass and plastic laminations, and causes the flexible walls of the bag to conform to and be pressed against the exterior surfaces of the laminated assembly by the surrounding atmosphere. Thus the assembled sheets within the bag are pressed firmly together under uniform pressure over the entire upper and lower surfaces thereof.

The bag 27 has flexible electrical heating units embedded in its upper and lower walls. The areas of these heating units are made such that they extend over the entire upper and lower surfaces of the laminated assemblies which are to be inserted and pressed in the bag. The requirements for flexibility of the bag walls and for uniform application of heat over the entire area of the laminated assembly are best met if the bag walls comprise layers of electrically conductive rubber substantially coextensive in area with the walls of the bag. Electrically conductive rubber is rubber having compounded therein ingredients which make the rubber a conductor of electricity, but this rubber has a sufficient resistance to the flow of electricity so that a substantial amount of heat is generated in the rubber when electric current flows therethrough. It will be understood that the expression "electrically conductive rubber" is used in this application to include the synthetic rubbers and analogous compositions as well as natural rubber, providing they have been compounded to make them electrically conductive.

Figure 4:
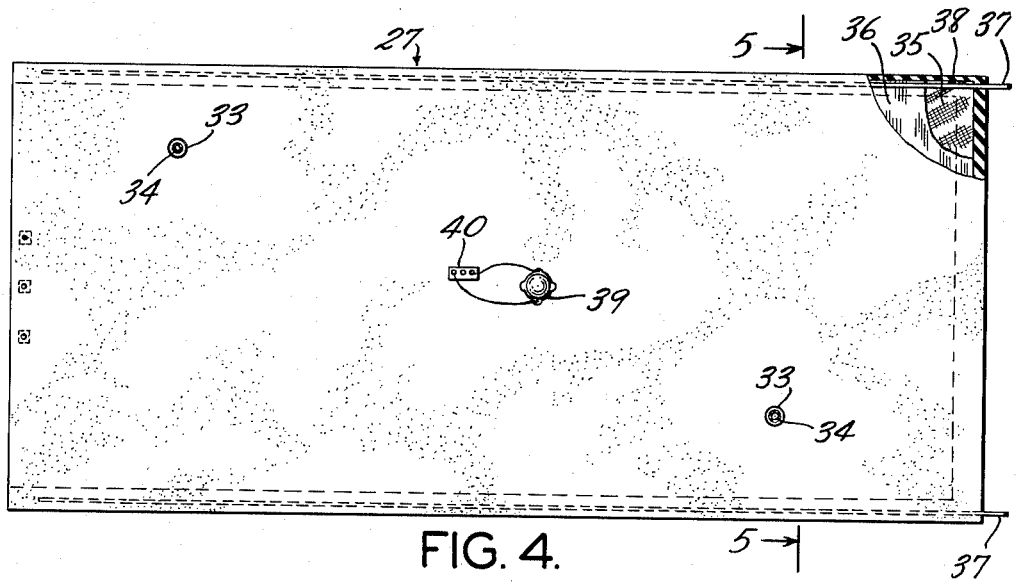
Figure 4 is a top plan view of the bag in which the laminated assembly is enclosed during the heating and preliminary pressing operation.
Figure 5:
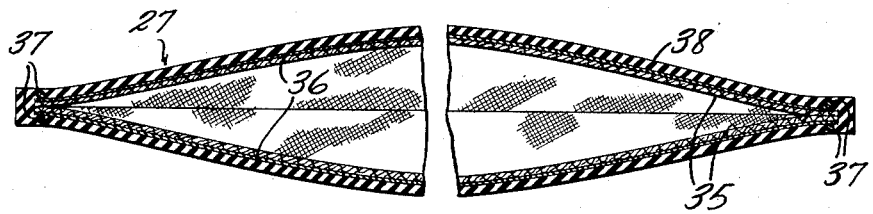
Figure 5 is a transverse section through the bag substantially on line 5—5 of Figure 4, but to larger scale for better disclosing the construction of the bag.

Details of the construction of the bag 27 are disclosed in Figures 4 and 5 of the drawings. The bag preferably is rectangular in shape, the side edges and one end being permanently sealed, and the other end open. The walls of the bag are made of conductive rubber coated fabric, the fabric layer being shown at 35 and the conductive rubber coating at 36. The fabric provides mechanical strength and serves as a protection for the conductive rubber when laminated assemblies are slid into and out of the open end of the bag. Adjacent the open end of the bag the fabric layer 35 is coated, interiorly of the bag, with rubber or other suitable material 41 which will insure a tight air seal when the end of the bag is clamped against the platform by the clamping bar 17. The bag is provided with an outer protective covering 38 which serves also as a heat insulator to limit the loss of heat from the bag. This outer covering preferably is a heat resistant neoprene compound which is molded in place over the electrically conductive layer to provide a unitary bag structure, the walls of which are impervious to the passage of air.

Embedded in the conductive layers 36, or in the neoprene covering 38 and in electrical engagement with the conductive layers, extending along both side edges of the bag are electrical leads 37. These leads, connected to the conductive rubber layers in both the upper and lower walls of the bag, extend out through the neoprene covering 38 and connections are made thereto to supply current to the conductive rubber layers 36. Preferably the leads 37 extending along opposite side edges of the bag are parallel to each other so that the length of the path through which the current flows in the conductive layer is uniform from one end of the bag to the other.

When the voltage is applied to the leads 37, current will flow through both of the conductive rubber layers from one side edge of the bag to the oppositely disposed side edge. Since the length of the current flow path through the conductive rubber layers is uniform in both the upper and lower walls, and from one end of the bag to the other, the walls and the laminated glass and plastic assembly within the bag will be uniformly heated over their entire areas. In one embodiment I have found that a voltage of 220 volts and a current flow of 21 amperes is adequate for the preliminary sealing of the laminated assembly, but it will be understood that these values may vary depending on the thickness and resistance of the conductive layer, the length of the current flow path, the temperature desired, and other factors.

Desirably a thermostatic control will be provided for regulating the current flow to produce the desired heat on the laminated assembly within the bag. One or more thermostats 40 may be incorporated right in the wall of the bag and connected in known manner to the current regulator. A signal lamp 39 may be mounted on the wall of the bag 27 to give a visual indication when current is flowing through the electrically conductive layers.

It may be desirable to provide a cushioning or heat resistant pad or layer on top of the platform 11, on which the bag 27 lies. Such a pad is shown at 11'.

Preparatory to operating the apparatus, the valves 25 and 26 will be opened. The valve 19 then will be manipulated to supply compressed air to the lower ends of the air cylinders to raise the clamping bar and hold the end of the bag open. An assembly of glass and interposed plastic sheets will be pushed into the bag, and back sufficiently from the open end of the bag to permit it to be closed without tipping the assembly relative to the platform, or placing the bag walls under undue stress. Then the valve 19 will be turned to supply compressed air to the upper ends of the air cylinders. Thus the bag will be closed and its upper and lower walls will be firmly pressed together between the clamping bar and the platform to seal the assembly within the bag. After exhausting air from the bag through the vacuum lines 34, electric current will be supplied through the leads 37 to the conductive rubber layers in the upper and lower walls of the bag. Upon completion of the preliminary sealing of the laminations the vacuum within the bag will be released, the valve 19 will be turned to raise the clamping bar, and the pressed assembly may be withdrawn from the bag. The assembly then may be transferred directly to an autoclave for completion of the final sealing between the laminations.

It will be understood that the invention herein disclosed may be variously modified and embodied within the scope of the subjoined claims.

I claim:

1. Apparatus for the preliminary pressing of bent laminated assemblies comprising two sheets of glass and an interposed sheet of plastic material which are to be bonded together into a unitary structure by the action of heat and pressure, which apparatus comprises, in combination, a bag substantially impervious to air, the walls of the bag comprising layers of electrically conductive rubber, means for quickly opening and holding open the openable end of the bag to insert and remove laminated assemblies and for quickly closing and clamping the said end of the bag to seal the bag after a laminated assembly has been inserted therein, a hose connection to the bag, means for evacuating air from the bag through the hose connection, and electrical leads connected to the electrically conductive rubber layers for passing current through the walls of the bag to heat a laminated assembly contained therein.

2. Apparatus according to claim 1, in which the layers of electrically conductive rubber extend over the entire surfaces of the laminated assembly and in which the electrical leads are embedded in the bag along oppositely disposed edges of the conductive layers.

3. Apparatus according to claim 1, in which the layers of electrically conductive rubber are substantially coextensive with the bag walls and in which the electrical leads are embedded therein along the side edges of the bag.

4. Apparatus for the preliminary pressing of bent laminated assemblies comprising two sheets of glass and an interposed sheet of plastic material which are to be bonded together into a unitary structure by the action of heat and pressure, which apparatus comprises, in combination, a bag substantially impervious to air, a horizontal platform on which the bag lies, means securing the lower wall of the bag to the platform adjacent the open end of the bag intermediate the side edges thereof, a clamping bar above and extending across the bag adjacent its open end, means securing the clamping bar to the upper wall of the bag intermediate the side edges thereof, and means for quickly lifting the clamping bar to open the bag and for quickly lowering the clamping bar and pressing it tightly against the bag to close and seal the open end of the bag.

5. Apparatus according to claim 4, in which the walls of the bag comprise flexible electrical heating elements, and in which electrical leads are connected to the heating elements for supplying current thereto.

6. Apparatus according to claim 5, in which the walls of the bag comprise layers of electrically conductive rubber and in which the leads are embedded therein along opposite side edges thereof.

7. Apparatus according to claim 4, in which there is a hose connection to the bag, and means for evacuating air from the bag through the hose connection.

8. Apparatus according to claim 4, in which the means for lifting and lowering the clamping bar includes a vertically disposed air cylinder secured to a cross support above the open end of the bag, the cross support being rigidly attached to vertical frame members extending upwardly from the platform, and in which the plunger of the air cylinder is connected to and supports the clamping bar.

9. Apparatus for the preliminary pressing of bent laminated assemblies comprising two sheets of glass and an interposed sheet of plastic material which are to be bonded together into a unitary structure by the action of the heat and pressure, which apparatus comprises, in combination, a bag made of fabric coated with electrically conductive rubber and covered with an impervious heat-insulating layer of heat resistant material. and electrical leads embedded in the bag wall in contact with the electrically conductive rubber along oppositely disposed edges of the bag for passing current through the electrically conductive layers in the walls of the bag.

10. Apparatus according to claim 9, in which the fabric is coated with rubber on the inside of the bag across its open end to seal the bag when the walls are clamped together at the open end of the bag.

References Cited in the file of this patent

UNITED STATES PATENTS

| | | |
|---|---|---|
| 1,872,693 | Drake | Aug. 23, 1932 |
| 1,960,580 | Fraser | May 29, 1934 |
| 2,054,864 | Owen | Sept. 22, 1936 |
| 2,458,864 | Lindsay | Jan. 11, 1949 |